United States Patent
Suzuki et al.

(10) Patent No.: US 9,596,656 B2
(45) Date of Patent: Mar. 14, 2017

(54) VEHICULAR WIRELESS TRANSMISSION APPARATUS ADJUSTING OUTPUT POWER ACCORDING TO VEHICLE

(71) Applicant: DENSO CORPORATION, Kariya, Aichi-pref. (JP)

(72) Inventors: Tadao Suzuki, Kariya (JP); Yasumune Yukizaki, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 133 days.

(21) Appl. No.: 14/272,608

(22) Filed: May 8, 2014

(65) Prior Publication Data

US 2014/0357311 A1 Dec. 4, 2014

(30) Foreign Application Priority Data

May 29, 2013 (JP) ................... 2013-113190

(51) Int. Cl.
*H04W 52/44* (2009.01)
*H04W 52/04* (2009.01)
(Continued)

(52) U.S. Cl.
CPC .......... *H04W 52/04* (2013.01); *H04B 1/3822* (2013.01); *H04B 17/102* (2015.01); *H04B 17/21* (2015.01); *H04B 2001/0416* (2013.01)

(58) Field of Classification Search
CPC .... H04B 17/102; H04B 17/21; H04B 1/3822; H04W 52/00; H04W 52/04; Y02B 60/50
(Continued)

(56) References Cited

U.S. PATENT DOCUMENTS 6,057,875 A * 5/2000 Ferguson ............... H03H 11/28
375/232
6,166,698 A 12/2000 Turnbull et al.
(Continued)

FOREIGN PATENT DOCUMENTS

JP  H09-326948 A   12/1997
JP  2000-244674    9/2000
(Continued)

OTHER PUBLICATIONS

Office Action mailed Apr. 28, 2015 in the corresponding JP Application No. 2013-113190 with English translation.

*Primary Examiner* — Hai V Nguyen
(74) *Attorney, Agent, or Firm* — Harness, Dickey & Pierce, P.L.C.

(57) ABSTRACT

A vehicular wireless transmission apparatus includes a memory that stores (i) a default adjustment value relative to a default vehicle model, (ii) a default vehicle model data indicating the default vehicle model, and (iii) a correction value table for correcting the default adjustment value to be compliant with each of different vehicle models different from the default vehicle model. When a host vehicle model data read from a different ECU does not match with the default vehicle model data stored in the memory, it is determined that the vehicular wireless transmission apparatus is presently mounted in a host vehicle model indicated by the host vehicle model data read from the different ECU. The default adjustment value is then corrected by retrieving a correction value corresponding to the host vehicle model data from the correction value table.

11 Claims, 9 Drawing Sheets

(51) Int. Cl.
*H04B 17/10* (2015.01)
*H04B 17/21* (2015.01)
*H04B 1/3822* (2015.01)
*H04B 1/04* (2006.01)

(58) Field of Classification Search
USPC .................................................. 455/522, 77
See application file for complete search history.

(56) References Cited

U.S. PATENT DOCUMENTS

| | | | | | |
|---|---|---|---|---|---|
| 6,195,602 | B1 * | 2/2001 | Hazama | ................ | G07C 5/008 |
| | | | | | 701/29.6 |
| 7,046,119 | B2 * | 5/2006 | Ghabra | ................ | B60R 25/245 |
| | | | | | 340/5.61 |
| 7,215,784 | B1 * | 5/2007 | Pham | ...................... | H03G 5/00 |
| | | | | | 381/103 |
| 7,923,962 | B2 * | 4/2011 | Jovanovich | ............. | B60R 13/10 |
| | | | | | 320/101 |
| 8,370,042 | B2 * | 2/2013 | Tokimasa | ............... | B60K 31/00 |
| | | | | | 701/70 |
| 9,438,280 | B2 * | 9/2016 | Yukizaki | ................. | H03F 3/195 |
| 9,438,292 | B2 * | 9/2016 | Sugimoto | ............ | H04B 1/3822 |
| 2003/0045946 | A1 | 3/2003 | Hattori et al. | | |
| 2006/0046638 | A1 | 3/2006 | Takeuchi et al. | | |
| 2006/0234781 | A1 | 10/2006 | Bosch | | |
| 2007/0285361 | A1 * | 12/2007 | Jovanovich | ............. | B60R 13/10 |
| | | | | | 345/87 |
| 2007/0291436 | A1 * | 12/2007 | Wells | ................... | H03G 3/3042 |
| | | | | | 361/140 |
| 2009/0048755 | A1 * | 2/2009 | Tokimasa | ............... | B60K 31/00 |
| | | | | | 701/94 |
| 2009/0254242 | A1 | 10/2009 | Kura | | |

FOREIGN PATENT DOCUMENTS

| | | |
|---|---|---|
| JP | 2003-267011 | 9/2003 |
| JP | 2007-308092 | 11/2007 |
| JP | 2008-258840 A | 10/2008 |
| JP | 2008-272345 A | 11/2008 |
| JP | 2010-258742 | 11/2010 |

* cited by examiner

VEHICLE FRONT ⟵  ⟶ VEHICLE REAR

VEHICULAR WIRELESS TRANSMISSION APPARATUS ADJUSTING OUTPUT POWER ACCORDING TO VEHICLE

CROSS REFERENCE TO RELATED APPLICATION

The present application is based on Japanese Patent Application No. 2013-113190 filed on May 29, 2013, the disclosure of which is incorporated herein by reference.

TECHNICAL FIELD

The present disclosure relates to a vehicular wireless transmission apparatus which connects an antenna to a wireless transmission portion with a coaxial cable.

BACKGROUND ART

Patent Literature 1: JP 2010-258742 A

Conventionally, an antenna and a wireless transmission portion are often connected using a coaxial cable. This connection is known to involve a loss when a signal is transmitted over the coaxial cable. In order to compensate such a loss, an input level is adjusted in Patent Literature 1.

In addition, considering mass production, a first wireless transmission portion needs to transmit a signal with an output power identical to that of any second wireless transmission portion different from the first wireless transmission portion. However, an inter-individual difference in a frequency characteristic etc. in the wireless transmission portions leads to an inter-individual difference in an output power as well. Then, in order to eliminate such an output power difference due to the inter-individual difference, each wireless transmission portion is subjected to adjustment while a resulting adjustment value is written in a storage portion.

When a subject wireless transmission apparatus is employed or mounted in each vehicle, an arrangement of an antenna and wireless transmission portion differs depending on each of different vehicle models of vehicles. The coaxial cable which connects the wireless transmission portion to the antenna also differs in length etc. depending on each vehicle model. This leads to a difference in signal losses produced in the coaxial cables of the different vehicle models. Further, in some cases, an antenna exhibits different gains depending on the different vehicle models. In contrast, a transmission output power of the wireless transmission apparatus is subject to a loss in a coaxial cable. Therefore, an adjustment value needs to be changed depending on each of the different vehicle models.

However, manufacturing a plurality of different kinds of wireless transmission apparatuses corresponding to a plurality of different vehicle models may disable a cost reduction in a mass production.

SUMMARY

It is an object of the present disclosure to provide a vehicular wireless transmission apparatus that permits an effective transmission output power emitted from an antenna to be an intended output power even if the apparatus is mounted in each of a plurality of different vehicle models of vehicles.

To achieve the above object, according to an example of the present disclosure, a vehicular wireless transmission apparatus in a vehicle belonging to a host vehicle model is provided to cooperate with a different apparatus that is provided in the vehicle to be separated from the vehicular wireless transmission apparatus. The different apparatus is provided to contain a host vehicle model data indicating the host vehicle model of the vehicle. The vehicular wireless transmission apparatus includes the following: an antenna; a wireless transmission portion which provides modulation and output power to a signal to transmit; and a coaxial cable that is included in a conductive line that connects the wireless transmission portion to the antenna. The apparatus further includes a table storage portion, an output adjustment section, and an adjustment value determination section. The table storage portion stores an adjustment value determination table that permits determining a determined adjustment value corresponding to each of a plurality of different vehicle models, the determined adjustment value being used to an adjustment of the output power of the wireless transmission portion so that an effective transmission output power emitted from the antenna is adjusted to a predetermined value. The output adjustment section which provides the adjustment of the output power of the wireless transmission portion based on the determined adjustment value. The adjustment value determination section reads the host vehicle model data indicating the host vehicle model from the different apparatus and determines the determined adjustment value corresponding to the host vehicle model based on (i) the read host vehicle model data and (ii) the adjustment value determination table stored in the table storage portion. Furthermore, the output adjustment section provides the adjustment of the output power of the wireless transmission portion based on the determined adjustment value corresponding to the host vehicle model determined by the adjustment value determination section.

Under the above configuration, the table storage portion stores an adjustment value determination table which can determine adjustment values depending on a plurality of different vehicle models. The adjustment value determination section reads out a host vehicle model data stored in the different apparatus that is also installed or mounted in the vehicle to be separated from the vehicular wireless transmission apparatus. Based on the read host vehicle model data and the adjustment value determination table, an adjustment value is determined which corresponds to the vehicle model of the vehicle where the vehicular wireless transmission apparatus is mounted presently. Thereby, even if the vehicular wireless transmission apparatus is mounted in each of a plurality of different vehicle models, the effective transmission output power emitted from the antenna can be regulated to be an intended output power.

This eliminates a need of preparing different vehicular wireless transmission apparatuses that are differently adjusted according to the respective different vehicle models. Therefore, a cost reduction can be achieved rather than the case of preparing the different vehicular wireless transmission apparatuses depending on the respective different vehicle models.

BRIEF DESCRIPTION OF THE DRAWINGS

The above and other objects, features, and advantages of the present disclosure will become more apparent from the following detailed description made with reference to the accompanying drawings. In the drawings:

FIG. 4 is a flowchart diagram illustrating a process by a CPU of a communication ECU at a time when power supply is turned into ON;

FIG. 7 is a flowchart diagram illustrating a process by a CPU of a communication ECU at a time when power supply is turned into ON;

FIG. 8 is a flowchart diagram illustrating a process by a CPU of an antenna module at a time when power supply is turned into ON;

FIG. 9 is a flowchart diagram illustrating a process by a CPU of an antenna module at a time when power supply is turned into ON;

DETAILED DESCRIPTION (First Embodiment)

Figure 1:
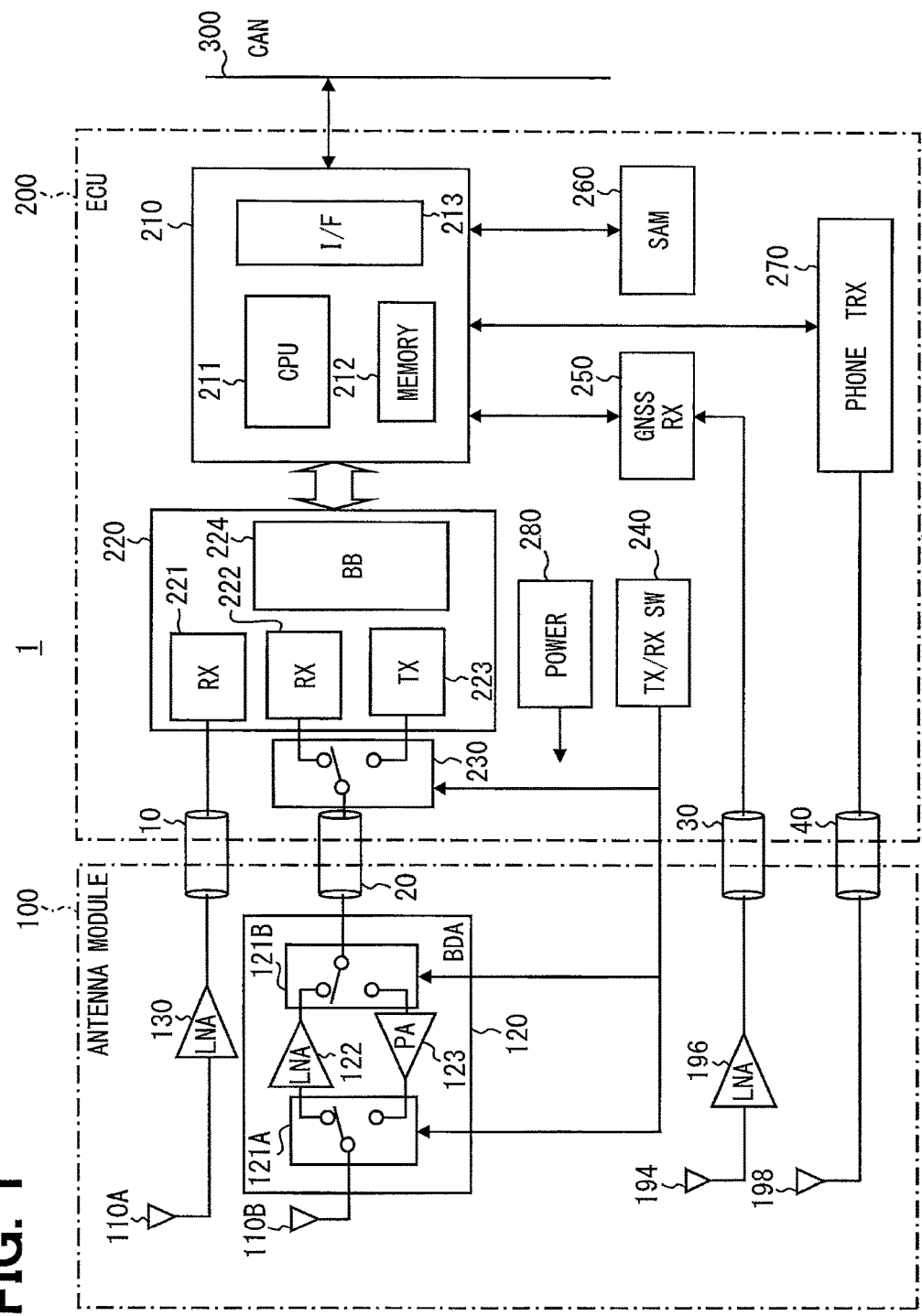
FIG. 1 is a diagram illustrating a configuration of a vehicular wireless communication apparatus according to a first embodiment of the present disclosure.

The following describes an embodiment of the present disclosure with reference to drawings. With reference to FIG. 1, a vehicular wireless communication apparatus 1 is a first embodiment of a vehicular wireless transmission apparatus of the present disclosure; the apparatus 1 in a vehicle includes an antenna module 100 and a communication ECU (Electronic Control Unit) 200. The vehicle is also referred to as a host vehicle where the vehicular wireless communication apparatus 1 is mounted. The wireless communication apparatus 1 performs vehicle-to-vehicle communications and/or roadside-to-vehicle communications using radio frequencies of 700 MHz band or 5.9 GHz band, for instance. The roadside-to-vehicle communications may be also referred to road-to-vehicle communications.

Figure 3:
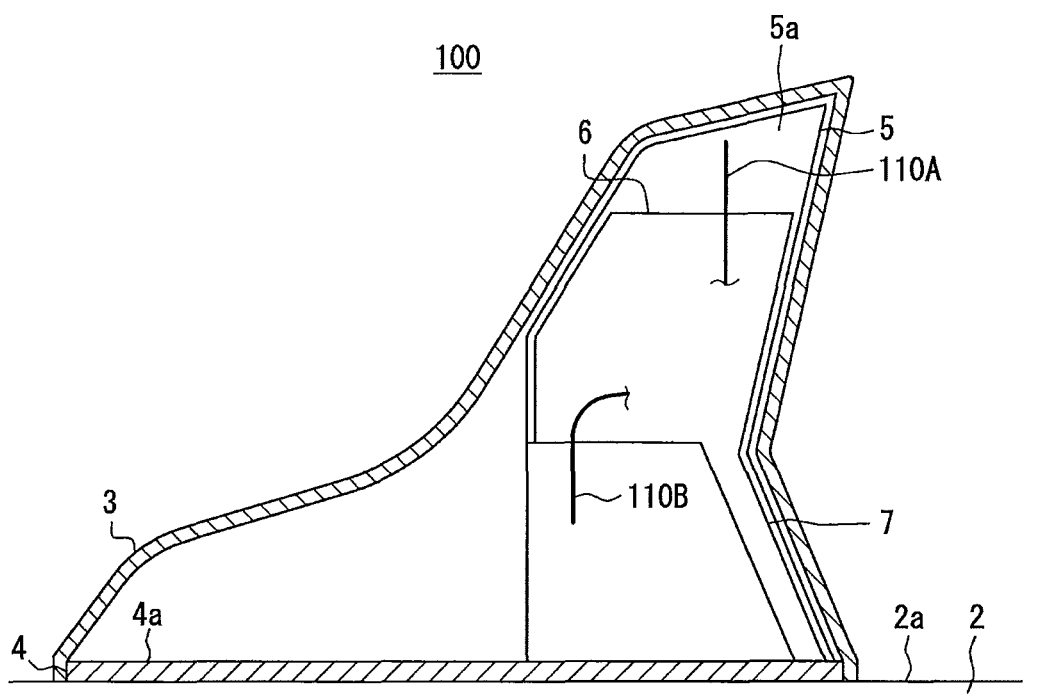
FIG. 3 is a partial sectional view in a state where an antenna module is mounted on a vehicle roof.

In the first embodiment, the antenna module 100 is installed on an upper surface 2a of a vehicle roof 2, as indicated in FIG. 3. In contrast, the communication ECU 200 is installed in a predetermined position inside of the vehicle. That is, the communication ECU 200 is provided as a single housing or body (unshown) separated from a single housing or module of the antenna module 100. The communication ECU 200 is desirably provided or disposed inside of the vehicle. Since it is an electronic component, it is desirably disposed at a position of which environment exhibits less temperature variation due to daylight etc.

(Configuration of Antenna Module 100)

The antenna module 100 has a configuration for vehicle-to-vehicle communications and roadside-to-vehicle communications by including two antennas 110A and 110B, a bidirectional amplifier (BDA) 120, and a low noise amplifier 130.

The BDA 120 includes two switches 121A and 121B, a low noise amplifier 122, and a power amplifier 123. These amplifiers 122 and 123 each are a fixed gain amplifier while the BDA 120 is to compensate a loss due to a coaxial cable 20.

The antenna module 100 further includes an antenna 194 for GNSS (Global Navigation Satellite System), a low noise amplifier 196, and an antenna 198 for a mobile phone. The GNSS antenna 194 is connected to the low noise amplifier 196, which is further connected to a coaxial cable 30. The mobile phone antenna 198 is connected to a coaxial cable 40.

The antenna 110A for vehicle-to-vehicle communications and roadside-to-vehicle communications is used only for reception and connected to the low noise amplifier 130. In contrast, the antenna 110B is used for both reception and transmission, the switching of which are achieved by the switches 121A and 121B as follows. At reception, the antenna 110B is connected to the communication ECU 200 via the low noise amplifier 122 and the coaxial cable 20. At transmission, the antenna 110B is connected to the communication ECU 200 via the power amplifier 123 and the coaxial cable 20.

(Configuration of Communication ECU 200)

The communication ECU 200 includes a computation portion 210, a communication chip 220 serving as a wireless transmission portion, a switch 230, an antenna switch circuit 240, a GNSS reception portion 250, a security access module (SAM) 260, a mobile phone communication portion 270, and a power supply source 280.

The GNSS reception portion 250 is connected to the GNSS antenna 194 via the coaxial cable 30; the portion 250 filters, amplifies, and demodulates the signal provided from the GNSS antenna 194 to provide a reception data to the computation portion 210. The SAM 260 encrypts and decrypts the signal transmitted and received via vehicle-to-vehicle communications or roadside-to-vehicle communications. The mobile phone communication portion 270 is connected to the mobile phone antenna 198 via the coaxial cable 40 while providing transmission and reception functions for connecting with a mobile phone line. The portion 270 receives, from the computation portion 210, a transmission data to the mobile phone line, and outputs, to the computation portion 210, a reception data from the mobile phone line. The power supply source 280 provides electric power for internal components of the communication ECU 200 as well as internal components of the antenna module 100.

The computation portion 210 includes a CPU 211, a memory 212, and an interface (I/F) portion 213. The CPU 211 may function also as an output adjustment section, which will be explained later in detail.

The memory 212 includes a rewritable nonvolatile memory at least; the memory 212 may include a volatile memory as well. In the following, the memory 212 is provided as a rewritable nonvolatile memory unless otherwise specified.

The memory 212 functions as an adjustment value storage portion, which stores an adjustment value that permits an adjustment such that an effective transmission output power emitted from the antenna 1106 turns into a predetermined output power. The adjustment value storage portion may be also referred to as an adjustment value determination table that permits determining an adjustment value corresponding to each of a plurality of different vehicle models. Applying the adjustment value leads to the adjustment of the output power of the transmission portion 223.

The memory 212 stores a default adjustment value when the ECU 200 is shipped after a default adjustment value determination process. The default adjustment value determination process is performed by specifying or selecting a default vehicle model (also referred to as a specific vehicle model); the default vehicle model may be defined as a vehicle model of a vehicle where the memory 212 itself or ECU 200 itself is supposed to be mounted or as a vehicle model of a vehicle that is temporarily used as a subject or target in the default adjustment value determination process. The memory 212 further stores a vehicle model data (also referred to as a default vehicle model data or a specific vehicle model data) that indicates the default vehicle model that is specified at the time of the default adjustment value determination process, which will be explained later in detail. The memory 212 may function also as a table storage portion. That is, the memory 212 stores a correction value table, which includes correction values used for adapting the default adjustment value to each of different vehicle models different from the default vehicle model. The correction values in the correction value table are predetermined based on experiments.

The I/F portion 213 is connected to a CAN (Controller Area Network) bus 300. The computation portion 210 acquires a variety of information in the vehicle via the I/F portion 213 and CAN bus 300, or transmits the acquired information to apparatuses in the vehicle.

The communication chip 220 includes two reception portions 221 and 222, a transmission portion 223, and a baseband processor 224. The present embodiment performs the vehicle-to-vehicle communications and the roadside-to-vehicle communications under the communications standards of IEEE802.11p.

The reception portion 221 is connected to the coaxial cable 10 to receive signals from the antenna 110A via the coaxial cable 10. The reception portion 221 provides a received high-frequency signal with signal processing of (i) demodulation into a signal of baseband, (ii) filtering, and (iii) amplification to provide a processed signal, which is sent to the baseband processor 224. The other reception portion 222 has the same function as that of the reception portion 221. The reception portion 222 is connected with the antenna 110B via the switch 230 and the coaxial cable 20.

The transmission portion 223 is also connected to the switch 230. The transmission portion 223 modulates a signal from the baseband processor 224 into a signal of high frequency band, amplifies the modulated signal up to a predetermined output power, and sends the amplified signal to the antenna module 100.

The switch 230 switches between two states of (i) the state of connecting the reception portion 222 to the coaxial cable 20 and (ii) the state of connecting the transmission portion 223 to the coaxial cable 20. The switch 230 is switched by the antenna switch circuit 240. The antenna switch circuit 240 has a function of switching between the transmission and reception based on a communication state of the communication chip 220. The baseband processor 224 applies or performs modulation or demodulation to the baseband signal. In addition, at the time of reception, the baseband processor 224 performs a reception diversity (i.e., a maximum ratio combining diversity).

The communication chip 220 can communicate mutually with the computation portion 210 at the time of reception or transmission of radio frequencies or radio frequency signals.

(Signals Outputted from and Inputted to Arithmetic Portion 210)

Figure 2:
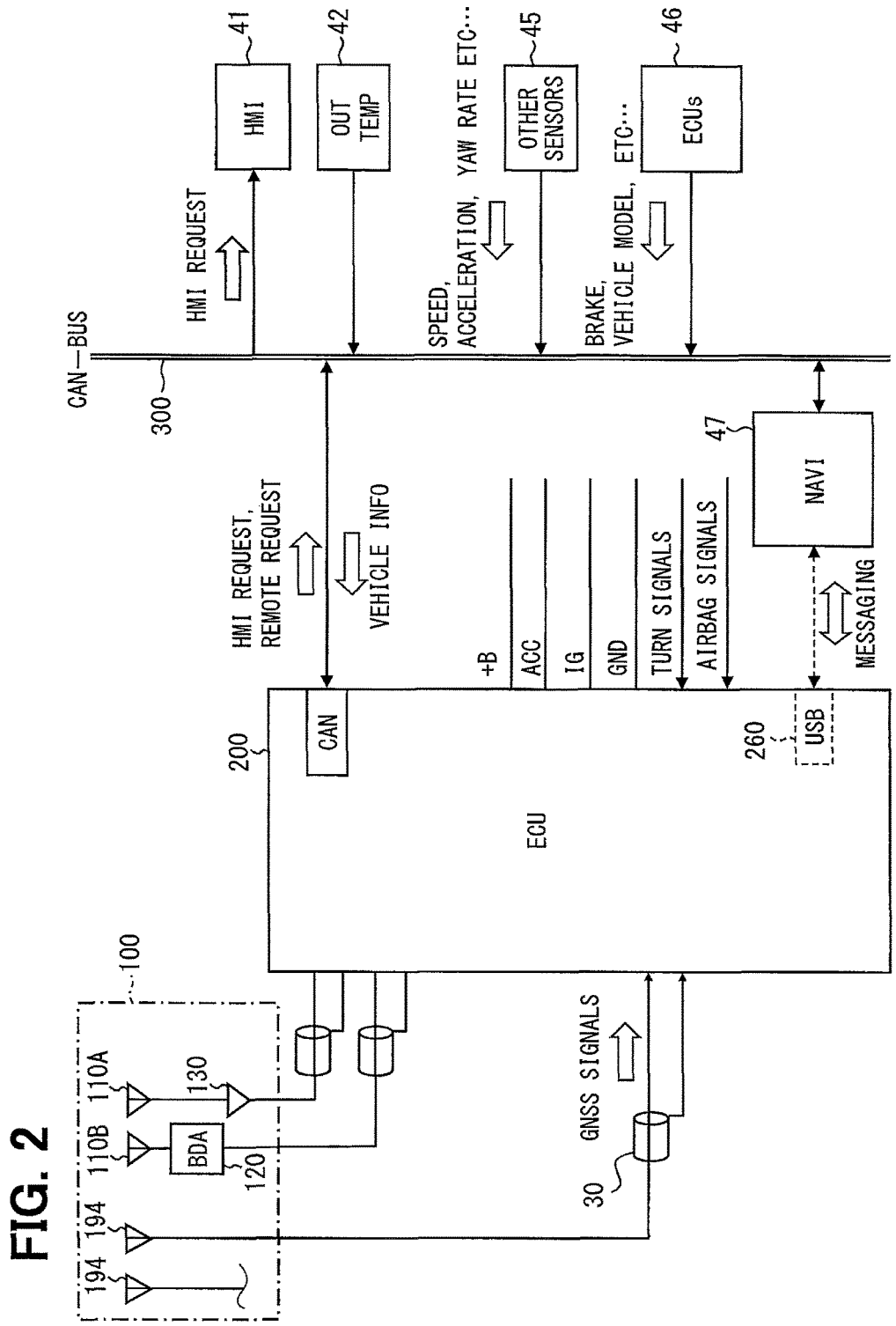
FIG. 2 is a diagram for explaining signals inputted to and outputted from a communication ECU.

As indicated in FIG. 2, the communication ECU 200 directly receives a battery power supply (+B), an accessories signal (ACC), an ignition signal (IG), a ground signal (GND), a turn signal (i.e., turn-signal light) that indicates the flickering state of a directional light, and an airbag signal that indicates the expansion state of an air bag.

In addition, the communication ECU 200 acquires an output of an HMI (Human Machine Interface) request signal, a variety of vehicle information via the CAN bus 300. The HMI request signal is provided to an HMI apparatus 41. The HMI apparatus 41 includes a meter display on vehicle.

As indicated in FIG. 2, the CAN bus 300 is connected with an outside air temperature sensor 42, other sensor group 45, a navigation apparatus 47, and other ECUs 46 that various ECUs other than the communication ECU 200.

The communication ECU 200 acquires a variety of vehicle information such as an outside air temperature, a vehicle speed, an acceleration, a yaw rate, a brake signal from the sensors 42 and 45 and other ECUs 46. Other ECUs 46 includes an ECU (also referred to as a different or foreign ECU 46) from which a host vehicle model data is acquired.

In addition, the communication ECU 200 may be provided with a USB connector 260 permitting a USB connection, via which the communication ECU 200 is enabled to connect to the navigation apparatus 47.

(Shape and Arrangement Position of Antenna Module 100)

With reference to FIG. 3, the antenna module 100 is provided with a housing 3, which has a streamline shape (so called a shirk fin shape) that is formed in a front-to-rear direction of the vehicle, for instance, from a viewpoint of appearance design.

A bottom plate 4 is made of a metal plate shaped of a plane being approximately rectangular. When the antenna module 100 is mounted on an upper surface 2a of a vehicle roof 2, the bottom plate 4 is disposed along the upper surface 2a. Further, a printed-circuit board 5 shaped of a flat plate is provided to be standing approximately perpendicularly from the plate surface 4a of the bottom plate 4.

The printed-circuit board 5 has a first side 5a on which an antenna ground 6 is formed with a conductive pattern (conductor film). In addition, the first side 5a includes a connection portion 7 that connects electrically the antenna ground 6 to the bottom plate 4. The connection portion 7 permits the antenna ground 6 to have the same potential as that of the bottom plate 4. In addition, the antennas 110A and 110B are also fixed to the printed-circuit board 5. It is noted that FIG. 3 omits a circuitry of the BDA 120 or the like.

(Default Adjustment Value of Transmission Output Power)

Each antenna 110B is required to transmit an electric wave (i.e., radio wave) with a predetermined output power even if there are existing inter-individual differences. To that end, a default adjustment value determination process is conducted before the shipment. This determination process determines an adjustment value that is needed when being mounted in a specific vehicle model (also referred to as a default vehicle model) serving as a target vehicle model for output power adjustment. The determined adjustment value is written in the memory 212 as a default adjustment value, together with the default vehicle model data indicating the default vehicle model. The adjustment value is designated also in consideration of a signal loss due to the coaxial cable 20.

The length of the coaxial cable 20, etc. differs depending on each of different vehicle models; thus, the signal loss in the coaxial cable differs depending on each vehicle model. Therefore, the adjustment is performed by specifying a vehicle model (i.e., the default vehicle model).

(Correction of Default Adjustment Value of Transmission Output Power)

The vehicular wireless communication apparatus 1 of the present embodiment can be adapted also for the different vehicle models other than the default vehicle model by executing the process explained in the following.

It is further noted that a flowchart in the present application includes sections (also referred to as steps), which are represented, for instance, as S1. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

(Process in CPU 211 when Power Supply is Turned into ON)

Figure 4:
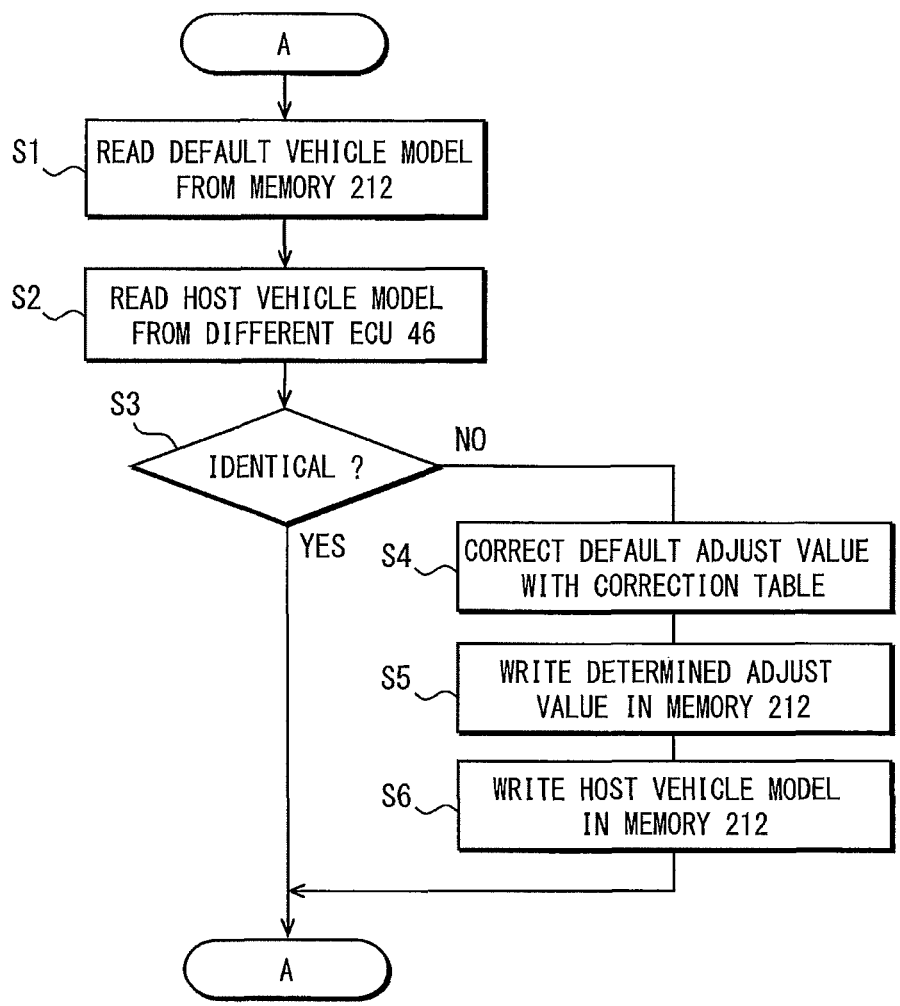

With reference to FIG. 4, with the power supply being turned into ON state, the CPU 211 of the communication ECU 200 reads out a default vehicle model data from the memory 212 (S1).

At S2, the CPU 211 acquires a host vehicle model data from the different ECU 46. The different ECU 46 is a body ECU, for example. The different ECU 46 from which the host vehicle model data is acquired is not necessary to specify previously. Naturally, the different ECU 46 from which the host vehicle model data may be specified previously.

At S3, it is determined whether the default vehicle model data read at S1, i.e., the default vehicle model data the CPU 211 itself stores, is the same as the host vehicle model data read out from the different ECU 46 at S2.

If the determination at S4 is affirmed, the present process of FIG. 4 is ended. This case permits the default adjustment value, which is determined at the default adjustment value determination process before shipment, to be used as it is; in other words, the default adjustment value is regarded as a determined adjustment value. When the determination at S4 is negated, the processing proceeds to S4.

The default adjustment value is then corrected by referring to the correction value compliant with the host vehicle model data read from the ECU (S4) from the correction value table.

At S5, the resultant corrected adjustment value after the correction is written in the memory 212 as a determined adjustment value by replacing the default adjustment value. At S6, the host vehicle model data read at S2 from the different ECU 46 is written in the memory 212.

(Process in CPU 211 at Usual Time)

Figure 5:
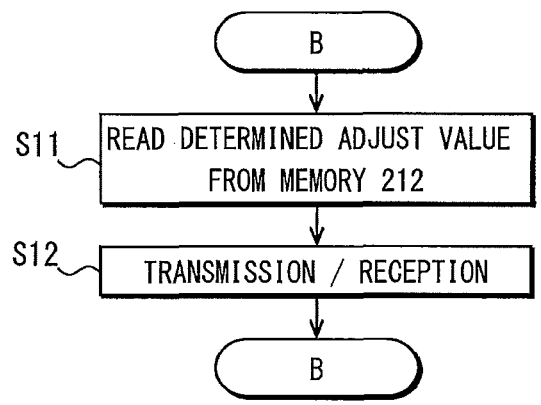
FIG. 5 is a flowchart diagram illustrating a process by a CPU of a communication ECU at a usual time.

After the flowchart of FIG. 4 is executed, the CPU 211 executes the flowchart of FIG. 5 at a usual time. The usual time or usual time point signifies any time point after the power supply is turned into the ON state. For example, the usual time may be any time point after the process of FIG. 4 is completed.

As indicated in FIG. 5, at S11, the determined adjustment value, which is presently stored after the amendment in the flowchart of FIG. 5, is read from the memory 212. That is, when the vehicle model of a host vehicle where the vehicular wireless communication apparatus 1 is actually or presently mounted is identical to the default vehicle model that is the target of the default adjustment value determination process, the default adjustment value that was written before the shipment is read out. In contrast, when the vehicle model of a host vehicle where the vehicular wireless communication apparatus 1 is actually or presently mounted is different from the default vehicle model, the corrected adjustment value that was written at S5 in FIG. 4 is read out. This processing may be referred to or function as an adjustment value determination section.

At S12, the CPU 211 performs transmission/reception process. The transmission/reception process includes controlling of the communication chip 220, adjusting of an output power of the transmission portion 223 using the adjustment value read at S11, setting of a communication channel, switching transmission and reception, setting of a transmit data, and reading of a received data.

As mentioned above, according to the present first embodiment, the memory 212 stores (i) a default adjustment value that is used for a default vehicle model, (ii) a default vehicle model data indicating the default vehicle model, and (iii) a correction value table including correction values for correcting the default adjustment value to a corrected adjustment value so as to be compliant with each of different vehicle models different from the default vehicle model. Preparing or storing the correction value table permits the correction of the default adjustment value such that the corrected adjustment value is compliant with a host vehicle model of a host vehicle, where the wireless communication apparatus is actually or presently mounted, even when the host vehicle model is different from the default vehicle model specified at the default amendment value determination process before shipment.

Further, when the host vehicle model data read from the different ECU 46 does not accord with the default vehicle model data stored in the memory 212 at the time when the power supply is turned into the ON state (S3: NO), it is determined that the wireless communication apparatus 1 is now mounted in the host vehicle mode indicated by the host vehicle model data read from the different ECU 46. In this case, the default adjustment value is then corrected into a corrected adjustment value (S4) by referring to the correction value, which is compliant with the host vehicle model data read from the different ECU 46, in the correction value table.

This configuration permits the communication ECU 200 of the present embodiment to achieve the output power of the transmission that previously supposes the loss of the coaxial cable 20 and the gain of BDA 120. Even if the vehicular wireless communication apparatus 1 is mounted in any one of the different vehicle models other than the default vehicle model, the effective transmission output power can be achieved to be an intended or desired value. This eliminates a need of preparing respective vehicular wireless communication apparatuses according to the different vehicle models to thereby enable the reduction of the number of the different vehicular wireless communication apparatuses. Therefore, a cost reduction can be achieved rather than the case where the respective vehicular wireless communication apparatuses are prepared according to the different vehicle models.

Further, the present embodiment explained an example configuration where when the host vehicle model data read from the different ECU 46 does not accord with the default vehicle model data stored in the memory 212 at the time when the power supply is turned into the ON state (S3: NO), the default adjustment value is corrected into the corrected adjustment value and this corrected adjustment value is written in the memory 212 as the determined adjustment value to replace the default adjustment value (S5). Further, the host vehicle model data read from the different ECU 46 is also written in the memory 212 (S6) to replace the default vehicle model data corresponding to the default adjustment value. Thereby, the determination at S3 at the time when the power supply is turned into the ON state at the next time will be affirmed; this eliminates the need of correcting the adjustment value each time when the power supply is turned into the ON state.

(Second Embodiment)

A second embodiment of the present disclosure will be explained. In the explanation of the second embodiment, an element may be assigned with the reference number identical to that of the element explained in the first embodiment. In such a case, the element with the identical reference number is identical to the element with the identical reference number explained in the first embodiment unless otherwise described. When only part of the configuration of the second embodiment is explained, the other part of the configuration may adopt those of the first embodiment previously explained.

Figure 6:
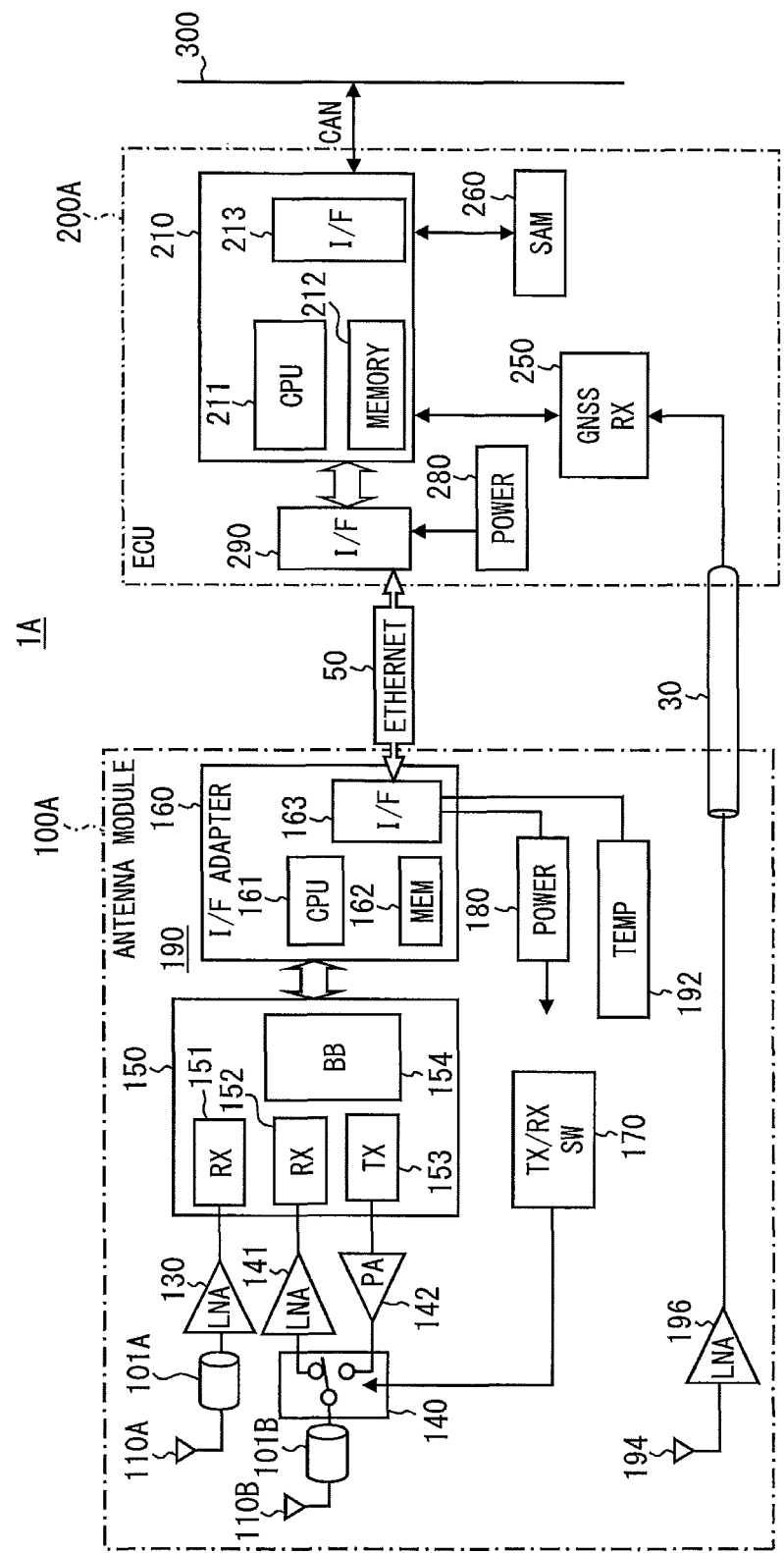
FIG. 6 is a diagram illustrating a configuration of a vehicular wireless communication apparatus according to a second embodiment of the present disclosure.

With reference to FIG. 6, a vehicular wireless communication apparatus 1A is a second embodiment of the present disclosure; the apparatus 1A includes an antenna module 100A and a communication ECU 200A. The antenna module 100A and communication ECU 200A are installed in the same positions as those of the antenna module 100 and the communication ECU 200 in the first embodiment, respectively.

(Configuration of Antenna Module 100A)

The antenna module 100A has a configuration for vehicle-to-vehicle communications and roadside-to-vehicle communications by including two antennas 110A and 110B, a switch 140, two low noise amplifiers 130 and 141, a power amplifier 142, a communication chip 150, an interface adapter 160, a switching circuit 170, and a power supply source 180.

The configuration excluding the two antennas 110A and 110B corresponds to a configuration of a wireless communication portion 190. It is noted that the wireless communication portion 190 just needs to perform wireless communications via the antennas 110A and 110B; the configuration of the portion 190 is not limited to that in FIG. 6.

The antenna 110A and the low noise amplifier 130 are connected via a coaxial cable 101A. The antenna 110B and the switch 140 are connected via a coaxial cable 101B.

The antenna module 100A further includes a GNSS antenna 194 for GNSS, and a low noise amplifier 196. The GNSS antenna 194 is connected to the low noise amplifier 196, which is further connected to a coaxial cable 30.

The switch 140 permits the antenna 110B to connect to the low noise amplifier 141 at reception and to connect to the power amplifier 142 at transmission.

The communication chip 150 includes two reception portions 151 and 152, a transmission portion 153, and a baseband processor 154. The reception portion 151 is connected to the low noise amplifier 130, whereas the reception portion 152 is connected to the low noise amplifier 141. At reception, the switch 140 causes the antenna 110B to be connected to the low noise amplifier 141, which is connected with the reception portion 152. Therefore, the two antennas 110A and 110B are used at reception. The antenna switch circuit 170 performs the switching of the switch 140.

The transmission portion 153 is also connected to the power amplifier 142. At transmission, the switch 140 is switched to connect the antenna 110B to the power amplifier 142 and the transmission portion 153.

The functions of the reception portions 151 and 152, the transmission portion 153, and the baseband processor 154 are the same as those of the reception portions 221 and 222, the transmission portion 223, and the baseband processor 224 of the first embodiment, respectively.

The communication chip 150 can communicate mutually with the interface adapter 160. The interface adapter 160 includes a CPU 161, a memory 162, and an interface (I/F) portion 163.

The CPU 161 may be referred to or function as an output adjustment section. The memory 162 includes a rewritable nonvolatile memory at least. The memory 162 may further include a volatile memory. In the following, the memory 162 is provided as a rewritable nonvolatile memory unless otherwise specified. The memory 162 stores the default vehicle model data, similarly. In addition, the default adjustment value written in the memory 212 of the communication ECU 200 in the first embodiment is written in the memory 162 that is included in the antenna module 100A in the second embodiment.

The memory 162 may further function also as a temperature table storage portion. That is, this memory 162 stores a temperature correction table for correcting an adjustment value depending on a temperature. The temperature correction table is to contain correction values with respect to the measurement temperatures, for instance. To be specific, the correction values include a correction amount of adjustment value or a correction coefficient of adjustment value. This table is based on a default temperature, which is a temperature at which the default adjustment value determination process. If a temperature detected by the temperature sensor 192 is the same as the default temperature, it is not necessary to correct the default adjustment value. Therefore, the correction amount of the adjustment value against the default temperature is zero (0), whereas the correction coefficient of the adjustment value against the default temperature is one (1).

The I/F portion 163 is connected to, as a communication cable, an Ethernet cable 50 for communicating via the communications standard of Ethernet (registered trademark). The CPU 161 communicates with the communication ECU 200A via the Ethernet cable 50 and the I/F portion 163. In addition, the CPU 161 controls the communication chip 150.

The switching circuit 170 switches the switch 140 based on the communication state of the communication chip 150.

The interface portion 163 receives electric power via the Ethernet cable 50 and is connected to the power supply source 180, which supplies the electric power to the components in the antenna module 100A. The temperature sensor 192 is disposed near the wireless communication portion 190 inside of the housing 3 (refer to FIG. 3) of the antenna module 100A, in order to detect a temperature of the wireless communication portion 190. The temperature sensor 192 outputs a signal which indicates the detected temperature to the interface portion 163.

(Configuration of Communication ECU 200A)

The communication ECU 200A and the antenna module 100A communicate with each other via the Ethernet cable 50.

The communication ECU 200A includes the computation portion 210, the GNSS reception portion 250, the SAM 260, and the power supply source 280, which are the same as those of the communication ECU 200 of the first embodiment; the ECU 200A further includes an interface portion 290.

Thus, the vehicular wireless communication apparatus 1A of the second embodiment has a configuration where communication chip 150 is included as an element in the antenna module 100A; this configuration is different from that of the first embodiment.

(Process in CPU 211 of ECU 200A when Power Supply is Turned into ON)

Figure 7:
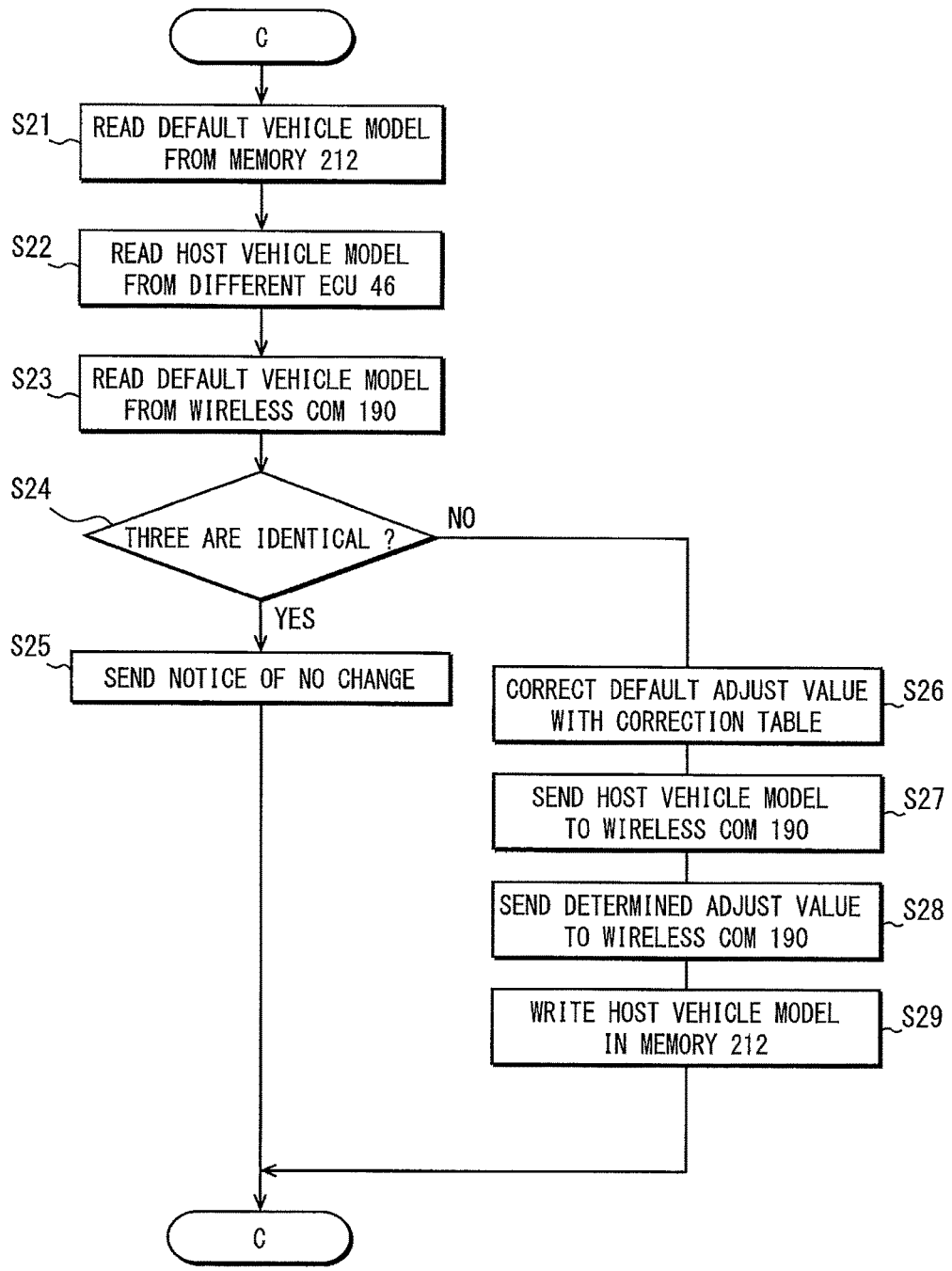

With reference to FIG. 7, like the first embodiment, with the power supply is turned into the ON state, the CPU 211 of the communication ECU 200A reads out a first default vehicle model data (also referred to as an ECU-default vehicle model data that indicates an ECU-specific vehicle model or an ECU-default vehicle model) from the memory 212 (S21), and acquires a host vehicle model data from the different ECU 46 (S22). Furthermore, at S23, a second default vehicle model data (also referred to as a specific vehicle model data that indicates a specific vehicle model or a default vehicle model) is read from the memory 162 in the wireless communication portion 190.

At S24, it is determined whether three vehicle model data acquired at S21 to S23 are identical. When the determination at S24 is affirmed, the processing proceeds to S25, where the notice indicating no change in the vehicle model data is transmitted to the wireless communication portion 190.

In contrast, when one vehicle model data is different from the other two data or three are different from each other, the determination at S24 is negated. This negative determination causes the processing to proceed to S26.

At S26, the default adjustment value is corrected by retrieving the correction value, which is compliant with the host vehicle model data read from the different ECU at S22, from the correction value table.

At S27, the host vehicle model data read from the different ECU 46 is sent to the wireless communication portion 190. At S28, the corrected adjustment value after the correction is transmitted to the wireless communication portion 190. At S29, the host vehicle model data read from the different ECU 46 is written in the memory 212 to replace the first default vehicle model data corresponding to the default adjustment value.

(Process in CPU 161 of Antenna Module 100A when Power Supply is Turned into ON)

Figure 8:
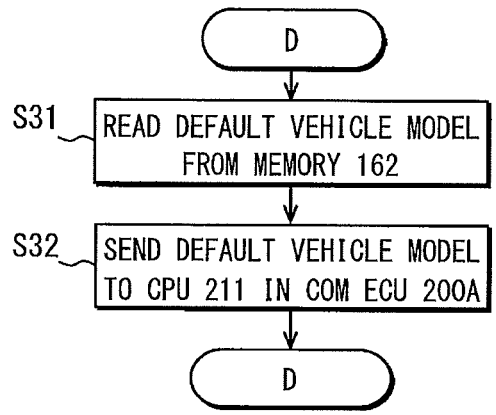

With reference to FIG. 8, when the power supply is turned into the ON state, the CPU 161 in the interface adapter 160 of the antenna module 100A reads out the second default vehicle model data from the memory 162 (S31), and transmits the read second default vehicle model data to the CPU 211 of the ECU 200A (S32). This processing at S32 permits the CPU 211 to acquire or read the second default vehicle model data at S23 of FIG. 7.

Figure 9:
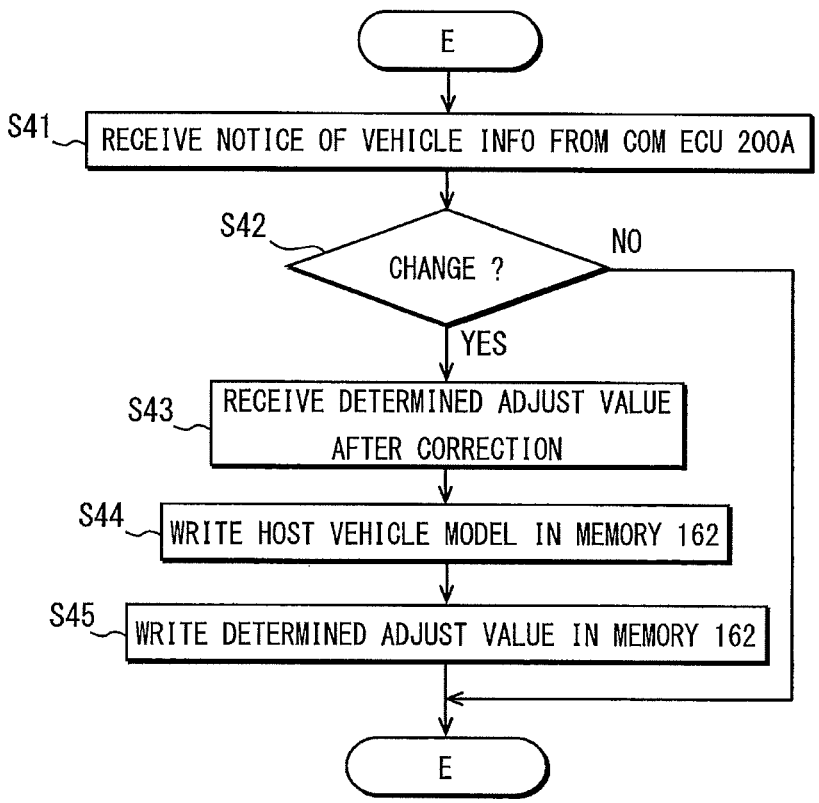

Furthermore, when the CPU 211 of the ECU 200A executes S25 or S27 of FIG. 7, the CPU 161 of the antenna module 100A receives a notice of vehicle model information from the ECU 200A at S41 in FIG. 9. This notice of vehicle model information signifies either (i) the notice of no change in the vehicle model data or (ii) the host vehicle model data.

At S42, it is determined whether the notice of vehicle model information received by S41 is (i) the notice of no change in the vehicle model data or (ii) the host vehicle model data. When the received notice is the notice of no change in the vehicle model data, the determination at S42 is negated, the present process in FIG. 9 is ended.

In contrast, when the received notice is the host vehicle model data, the determination at S42 is affirmed. The processing thus proceeds to S43. At S43, the CPU 161 receives the corrected adjustment value after the correction from the CPU 211 of the ECU 200A. At S44, the host vehicle model data received at S41 is written in the memory 162. At S45, the corrected adjustment value received at S45 is written in the memory 162 as a determined adjustment value.

(Process in CPU 161 of Antenna Module 100A at Usual Time)

Figure 10:
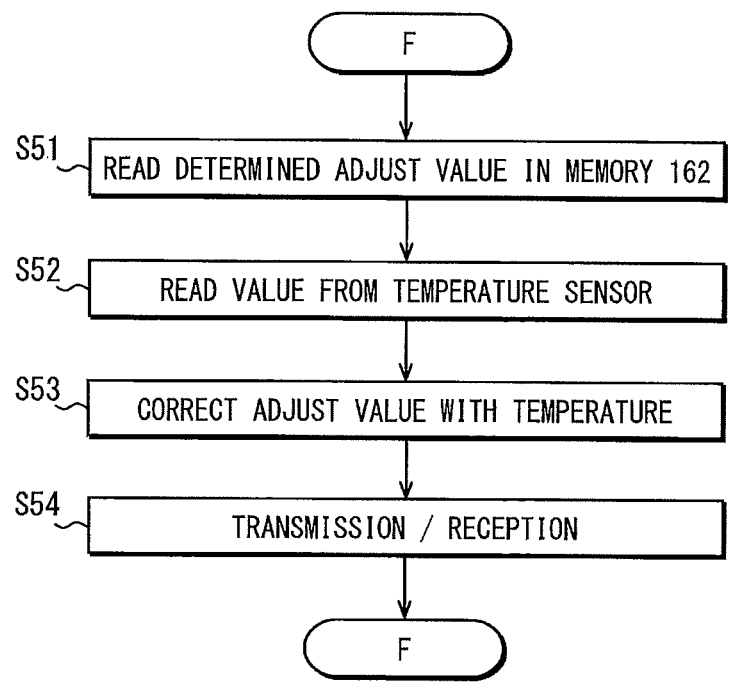
FIG. 10 is a flowchart diagram illustrating a process by a CPU of an antenna module at a usual time.

FIG. 10 illustrates a process at a usual time after the flowchart in FIG. 9 is executed. At S51, the CPU 161 of the antenna module 100A reads the adjustment value (i.e., determined adjustment value) stored in the memory 162. At S52, a sensor value is read from the temperature sensor 192.

At S53, the adjustment value read at S51 is further corrected, if necessary, using (i) the sensor value, i.e., the temperature of the wireless communication portion 190, read at S52, and (ii) the temperature correction table.

Then, at S54, the transmission/reception process is performed based on the adjustment value that was further corrected at S53, if necessary. The transmission/reception process at S54 is similar to that at S12 in FIG. 5.

The second embodiment can provide an advantageous effect in addition to that of the first embodiment as follows.

That is, in the second embodiment, the first default vehicle model data is obtained from the memory 212 (S21); the host vehicle model data is obtained from the different ECU 46 (S22); and the second default vehicle model data is obtained from the memory 162 of the wireless communication portion (S23). Thereby, it is determined whether three vehicle model data are identical to each other.

The vehicular wireless communication apparatus 1A according to the second embodiment has a configuration that includes the antenna module 100A and the communication ECU 200A as two separate housings or bodies. In this apparatus 1A, some defect may involve the replacement of the antenna module 100A (or its wireless communication portion 190) alone or the communication ECU 200A alone. Even in such a case, the replacement can be determined. Naturally, even when both of them are replaced simultaneously, the replacement can be determined.

When any one of the antenna module 100A, the wireless communication portion 190, and the communication ECU 200A is determined to be substituted, the adjustment value is corrected based on the host vehicle model data obtained from the different ECU 46 (S26). Therefore, even when the replacement is made, the effective transmission output power can be maintained to be an intended value.

In addition, in the second embodiment, the power amplifier 142 and the communication chip 150 are included in the antenna module 100A. This configuration can reduce a signal loss in between the antenna 110B and the communication chip 150. On the other hand, since the antenna module 100A is installed on an upper surface 2a of the vehicle roof 2, the temperature variation in the power amplifier 142 or the communication chip 150 is significant.

In the second embodiment, the antenna module 100A includes the temperature sensor 192 and stores the temperature correction table containing temperature correction values. The adjustment value written in the memory 162 is corrected using the detected temperature and the temperature correction table. Therefore, even if the temperature variation in the power amplifier 142 or the communication chip 150 is great, the effective transmission output power can be regulated to be an intended output power.

(Modifications)

The preferred embodiments of the present disclosure are described in the above; however, the present disclosure is not limited to the above embodiment. The following embodiment is also included in the technical scope of the present disclosure; furthermore, another embodiment or modification other than the following is also included in the technical scope of the present disclosure as long as not deviating from the technical subject matter.

(Modification 1)

For example, the first embodiment uses the BDA 120; the BDA 120 may be replaced by two amplifiers.

(Modification 2)

The first and second embodiments provide an example configuration where the memory 212 stores a correction value table, which includes correction values used for adapting the default adjustment value to each of different vehicle models different from the default vehicle model that is used at the default adjustment value determination process. Alternatively, the memory 212 may store an adjustment determination table, which contains different adjustment values, which are obtained after correcting the default adjustment value depending on the respective different vehicle models.

In addition, in the second embodiment, the adjustment value is corrected using the temperature information after executing S51 (S52, S53). Without need to be limited thereto, S52 and S53 may be omitted.

(Modification 3)

In addition, in the first and second embodiments, the antenna modules 100 and 110A each include two antennas 110A and 110E in order to perform reception diversity in vehicle-to-vehicle communications and roadside-to-vehicle communications. There is no need to be limited thereto. Only one antenna may be provided for performing vehicle-to-vehicle communications and roadside-to-vehicle communications; alternatively, more than two antennas may be provided.

(Modification 4)

In addition, only either the vehicle-to-vehicle communications or the roadside-to-vehicle communications may be performed.

(Modification 5)

The second embodiment has a configuration including the Ethernet cable 50 which communicates between the antenna module 100A and the communication ECU 200A. Any other communication cable may be used to the communication between the antenna module 100A and the communication ECU 200A.

(Modification 6)

Figure 11:
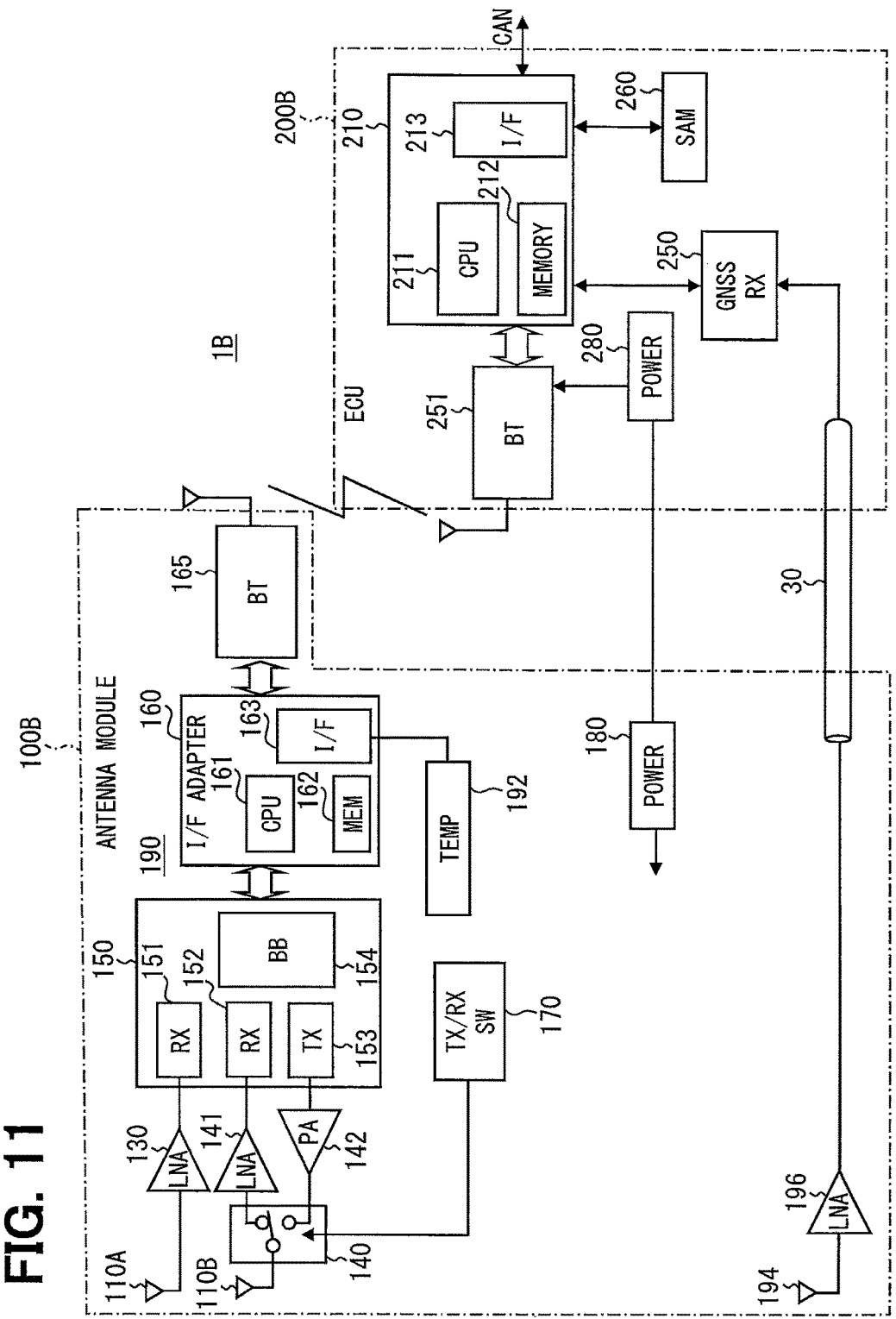
FIG. 11 is a diagram illustrating an example where Bluetooth communication circuits connect an antenna module with a communication ECU.

The antenna module and the communication ECU may be connected via wireless communications. FIG. 11 illustrates a configuration of a vehicular wireless communication apparatus 1B, which includes an antenna module 100B, a communication ECU 200B, and Bluetooth (registered trade mark) transmission/reception circuits 165 and 251. The antenna module 100B and the communication ECU 200B communicate with each other via the Bluetooth transmission/reception circuits 165 and 251. In this modification 6, the power supply source 280 is provided with a power supply cable line via which electric power is supplied to the antenna module 100B. In addition, in FIG. 11, the coaxial cables 101A and 101E are omitted.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular wireless transmission apparatus used by being installed in a host vehicle that belongs to a host vehicle model, the vehicular wireless transmission apparatus cooperating with a different apparatus that is provided in the host vehicle to be separated from the vehicular wireless transmission apparatus, the different apparatus containing a host vehicle model data indicating the host vehicle model of the host vehicle, the vehicular wireless transmission apparatus comprising:

an antenna;

a wireless transmission portion which provides modulation and output power to a signal to transmit;

a coaxial cable that is included in a conductive line that connects the wireless transmission portion to the antenna;

an adjustment value storage portion that is rewritable, storing, before being installed in the host vehicle, (i) default vehicle model data that indicates a default vehicle model, as determined vehicle model data, and (ii) a default adjustment value that corresponds to the default vehicle model, as a determined adjustment value;

a table storage portion that stores, before being installed in the host vehicle, an adjustment value determination table that permits determining the determined adjustment value corresponding to each of a plurality of different vehicle models other than the default vehicle model, the adjustment value determination table being used when correcting the default adjustment value to be compliant with each of the plurality of different vehicle models;

an output adjustment section which provides an adjustment of the output power of the wireless transmission portion after being installed in the host vehicle based on the determined adjustment value so as to adjust an effective transmission power emitted from the antenna to a predetermined value; and an adjustment value determination section that reads, after being installed in the host vehicle, the host vehicle model data indicating the host vehicle model from the different apparatus and, then, performs a determination as to whether the host vehicle model data read from the different apparatus is identical to the determined vehicle model data stored in the adjustment value storage portion, wherein when the performed determination is affirmed, the adjustment value determination section maintains the determined adjustment value, which was stored in the adjustment value storage portion before the vehicular wireless transmission apparatus is installed in the host vehicle, to be unchanged;

when the performed determination is negated, the adjustment value determination section determines a corrected adjustment value corresponding to the host vehicle model data read from the different apparatus based on the adjustment value determination table, which has stored in the table storage portion before the vehicular wireless transmission apparatus is installed in the host vehicle, stores, as the determined adjustment value, the corrected adjustment value in the adjustment value storage portion, and writes, as the determined vehicle model data, the host vehicle model data read from the different apparatus over in the adjustment value storage portion; and the output adjustment section provides the adjustment of the output power of the wireless transmission portion, after being installed in the host vehicle, based on the determined adjustment value that is presently stored in the adjustment value storage portion and corresponding to the host vehicle model data read from the different apparatus.

2. The vehicular wireless transmission apparatus according to claim 1, further comprising:
an antenna module provided in a predetermined position of the host vehicle as a module contained in a single housing, the antenna module including the antenna, the wireless transmission portion, the adjustment value storage portion, and the output adjustment section; and
an electronic control unit referred to as an ECU contained in a different single housing that is separated from the single housing of the antenna module, the ECU including the adjustment value determination section and the table storage portion,
wherein:
the table storage portion of the ECU is rewritable and stores an ECU-default vehicle model data indicating an ECU-default vehicle model as an ECU-determined vehicle model data;
the adjustment value determination section performs a three-comparison determination as to whether or not all three data are identical to each other,
the three data being (i) the host vehicle model data read from the different apparatus, (ii) the determined vehicle model data stored in the adjustment value storage portion, and (iii) the ECU-determined vehicle model data stored in the table storage portion;
when the performed three-comparison determination is affirmed, the adjustment value determination section maintains the determined adjustment value stored in the adjustment value storage portion to be unchanged; and
when the performed three-comparison determination is negated, the adjustment value determination section
determines a corrected adjustment value corresponding to the host vehicle model of the host vehicle where the vehicular wireless transmission apparatus is presently mounted based on the host vehicle model data read from the different apparatus and the adjustment value determination table stored in the table storage portion,
stores the corrected adjustment value as the determined adjustment value in the adjustment value storage portion, and further
writes the host vehicle model data read from the different apparatus, as each of the determined vehicle model data and the ECU-determined vehicle model data, over in the adjustment value storage portion.

3. The vehicular wireless transmission apparatus according to claim 1, further comprising:
an antenna module provided in a predetermined position in an outside face of the host vehicle as a module contained in a single housing, the antenna module including (i) the antenna and (ii) an amplifier that amplifies signal from the wireless transmission portion and transmits the amplified signal to the antenna,
wherein:
the wireless transmission portion is provided in a predetermined position inside of the host vehicle; and
the coaxial cable connects the wireless transmission portion inside of the host vehicle to the amplifier in the outside face of the host vehicle.

4. The vehicular wireless transmission apparatus according to claim 3, further comprising:
a temperature sensor to detect temperatures of the wireless transmission portion and the antenna module; and
a temperature table storage portion that stores a temperature correction table containing a temperature correction value to correct the determined adjustment value to a value depending on a temperature,
wherein the adjustment value determination section corrects the determined adjustment value, which was determined based on the adjustment value determination table stored in the table storage portion, by using the temperature correction table stored in the temperature table storage portion and the temperatures detected by the temperature sensor.

5. The vehicular wireless transmission apparatus according claim 1, further comprising:
an antenna module provided in a predetermined position in an outside face of the host vehicle as a module contained in a single housing, the antenna module including at least the antenna and the wireless transmission portion; and
an electronic control unit provided in a predetermined position inside of the host vehicle, to be contained in a different single housing that is separated from the single body of the antenna module, the electronic control unit including at least the adjustment value determination section,
wherein the antenna module in the outside face of the host vehicle is connected to the electronic control unit inside of the host vehicle via a cable to communicate with each other.

6. The vehicular wireless transmission apparatus according to claim 5, further comprising:
a temperature sensor to detect a temperature of the wireless transmission portion in the antenna module; and
a temperature table storage portion that stores a temperature correction table containing a temperature correction value to correct the determined adjustment value to a value depending on a temperature,
wherein the adjustment value determination section corrects the determined adjustment value, which was determined based on the adjustment value determination table stored in the table storage portion, by using the temperature correction table stored in the temperature table storage portion and the temperature detected by the temperature sensor.

7. The vehicular wireless transmission apparatus according to claim 1, wherein:
the adjustment value determination section reads, after being installed in the host vehicle and then powered-up, the host vehicle model data indicating the host vehicle model from the different apparatus and performs the determination as to whether the host vehicle model data read from the different apparatus is identical to the determined vehicle model data stored in the adjustment value storage portion.

8. The vehicular wireless transmission apparatus according to claim 1, wherein:
after being installed in the host vehicle and having performed the determination as to whether the host vehicle model data read from the different apparatus is identical to the determined vehicle model data stored in the adjustment value storage portion, the adjustment value determination section again reads, when being newly powered-up while being installed in the host vehicle, the host vehicle model data from the different apparatus and performs an additional determination as to whether the host vehicle model data read from the different apparatus is identical to the determined vehicle model data stored in the adjustment value storage portion, wherein when the performed additional determination is affirmed, the adjustment value determination section maintains the determined adjustment value presently stored in the adjustment value storage portion, to be unchanged;

when the performed additional determination is negated, the adjustment value determination section determines a corrected adjustment value corresponding to the host vehicle model data read from the different apparatus based on the adjustment value determination table, which has been stored in the table storage portion before the vehicular wireless transmission apparatus is installed in the host vehicle, stores, as the determined adjustment value, the corrected adjustment value in the adjustment value storage portion, and writes, as the determined vehicle model data, the host vehicle model data read from the different apparatus over in the adjustment value storage portion; and the output adjustment section provides the adjustment of the output power of the wireless transmission portion based on the determined adjustment value that is presently stored in the adjustment value storage portion and corresponding to the host vehicle model data read from the different apparatus.

9. The vehicular wireless transmission apparatus according to claim 1, further comprising:

an antenna module provided in a predetermined position of the host vehicle as a module contained in a single first housing, the antenna module including the antenna, the wireless transmission portion, the adjustment value storage portion, and the output adjustment section;

an electronic control unit referred to as an ECU contained in a different single second housing that is separated from the single first housing of the antenna module, the ECU including the adjustment value determination section and the table storage portion; and a communication link via which the antenna module in the first housing communicates data with the ECU in the second housing, wherein:

the table storage portion of the ECU in the second housing is rewritable and stores an ECU-default vehicle model data indicating an ECU-default vehicle model as an ECU-determined vehicle model data;

the adjustment value determination section in the second housing performs a three-comparison determination as to whether or not all three data are identical to each other, the three data being (i) the host vehicle model data read from the different apparatus, (ii) the determined vehicle model data stored in the adjustment value storage portion in the first housing, and (iii) the ECU-determined vehicle model data stored in the table storage portion in the second housing;

when the performed three-comparison determination is affirmed, the adjustment value determination section maintains the determined adjustment value stored in the adjustment value storage portion to be unchanged; and when the performed three-comparison determination is negated, the adjustment value determination section determines a corrected adjustment value corresponding to the host vehicle model of the host vehicle where the vehicular wireless transmission apparatus is presently mounted based on the host vehicle model data read from the different apparatus and the adjustment value determination table stored in the table storage portion, stores the corrected adjustment value as the determined adjustment value in the adjustment value storage portion in the first housing, and further writes the host vehicle model data read from the different apparatus, as each of the determined vehicle model data and the ECU-determined vehicle model data, over in the adjustment value storage portion in the first housing.

10. A method executed by a computer in a vehicular wireless transmission apparatus used by being installed in a host vehicle that is either (i) a default vehicle or (ii) one of a plurality of different vehicles other than the default vehicle, the vehicular wireless transmission apparatus including (i) an antenna; (ii) a wireless transmission portion providing modulation and output power to signals to transmit; a coaxial cable connecting the wireless transmission portion to the antenna; an adjustment value storage portion that is rewritable; and a correction value table storage portion, the method comprising:

storing in the adjustment value storage portion, before being installed in the host vehicle, (i) as a determined vehicle model data, a default vehicle model data that indicates a default vehicle model of the default vehicle, and (ii) as a determined adjustment value, a default adjustment value that corresponds to the default vehicle model;

storing in the correction value table storage portion, before being installed in the host vehicle, a correction value table specifying correction values that permit determining the determined adjustment value corresponding to each of the plurality of different vehicles, the correction value table being used when correcting the default adjustment value to be compliant with each of the plurality of different vehicles;

communicating, after being installed in the host vehicle, with a different apparatus in the host vehicle;

reading, while communicating with the different apparatus, a host vehicle model data indicating a host vehicle model of the host vehicle from the different apparatus;

performing, following the reading of the host vehicle model data, a determination as to whether or not the host vehicle model data read from the different apparatus is identical to the determined vehicle model data stored in the adjustment value storage portion, wherein when the performed determination is affirmed, the determined vehicle model data and the determined adjustment value presently stored in the adjustment value storage portion are maintained unchanged, when the performed determination is negated, a corrected adjustment value corresponding to the host vehicle model data read from the different apparatus is determined based on the correction value table stored in the correction value table storage portion, the corrected adjustment value is stored, as the determined adjustment value, in the adjustment value storage portion, and further the host vehicle model data read from the different apparatus is written, as the determined vehicle model data, over in the adjustment value storage portion; and, then, providing an adjustment of an output power of the wireless transmission portion based on the determined adjustment value that is presently stored in the adjustment value storage portion and is corresponding to the host vehicle model data read from the different apparatus.

11. The method according to claim 10, wherein
communicating with the different vehicle after being installed in the host vehicle is made when being powered-up after being installed in the host vehicle.

* * * * *